United States Patent [19]

Chatten

[11] Patent Number: 5,181,338

[45] Date of Patent: Jan. 26, 1993

[54] BIRD DETERRENT METHOD AND DEVICE

[76] Inventor: Victor H. Chatten, 1567 West 215th St., Torrance, Calif. 90501

[21] Appl. No.: 892,557

[22] Filed: Jun. 2, 1992

Related U.S. Application Data

[63] Continuation-in-part of Ser. No. 780,377, Oct. 3, 1991, abandoned, which is a continuation of Ser. No. 557,411, Jul. 23, 1990, abandoned.

[51] Int. Cl.⁵ .............................................. A01M 1/10
[52] U.S. Cl. ............................................. 43/58; 43/1
[58] Field of Search ......................... 43/1, 58, 26.1, 61, 43/98; 116/22 A; 52/101; 119/96

[56] References Cited

U.S. PATENT DOCUMENTS 2,456,731 12/1948 Peles .
2,475,047  7/1949 Peles .
2,777,171  1/1957 Burnside et al. .
2,888,716  6/1959 Kaufmann .
3,191,239  6/1965 Moore et al. .
3,282,000 11/1966 Shaw et al. .

Primary Examiner—Richard K. Seidel
Assistant Examiner—Chuck Y. Mah
Attorney, Agent, or Firm—Lyon & Lyon

[57] ABSTRACT

A bird deterrent device and method which combines the deterrence of an inanimate bird deterrent device with the erratic behavior of a movable deterrant device without injury to the brids or the use of sharp and portions. The present invention uses a multiplicity of projecting members which radiate out from a flange and base that is secured to a bird perching area. The projecting members may be aligned in a coplanar fashion with the flange so as to be suited to deter birds from perching on narrow building ledges or the wires may extend outward in different planes. The projecting members are of sufficient length so as to be visibly disturbed by an available draft of air but are not strong enough to support the weight of a perching bird. The physical presence of the device and the erratic independent movement of the projecting members, with the resulting physical obstruction so created, deter birds from perching at or near the device.

31 Claims, 6 Drawing Sheets

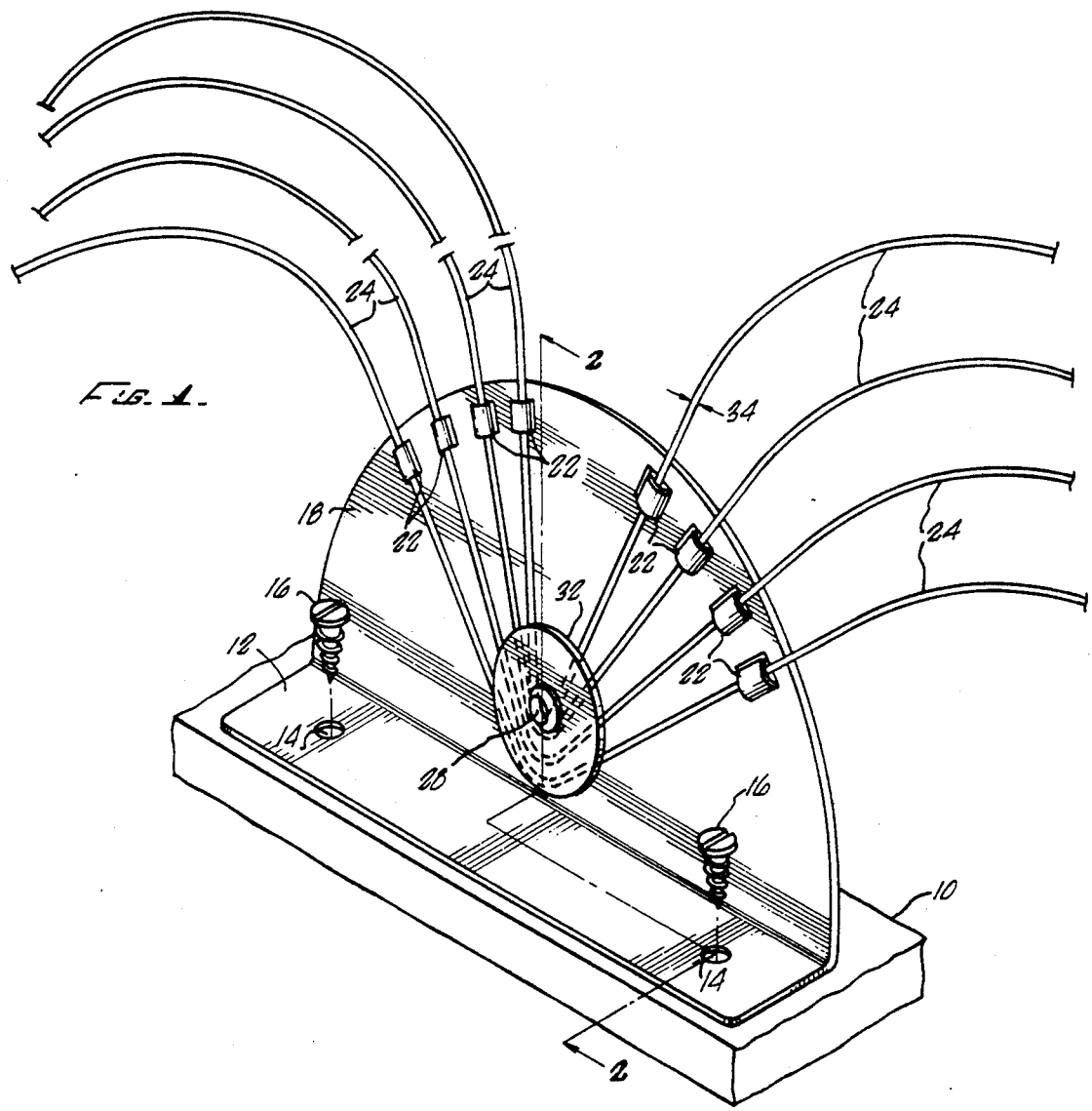

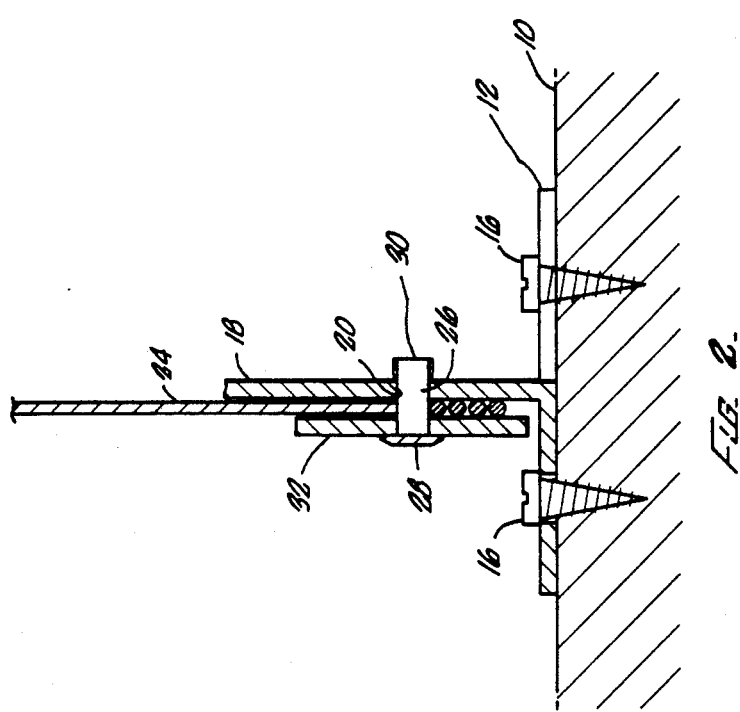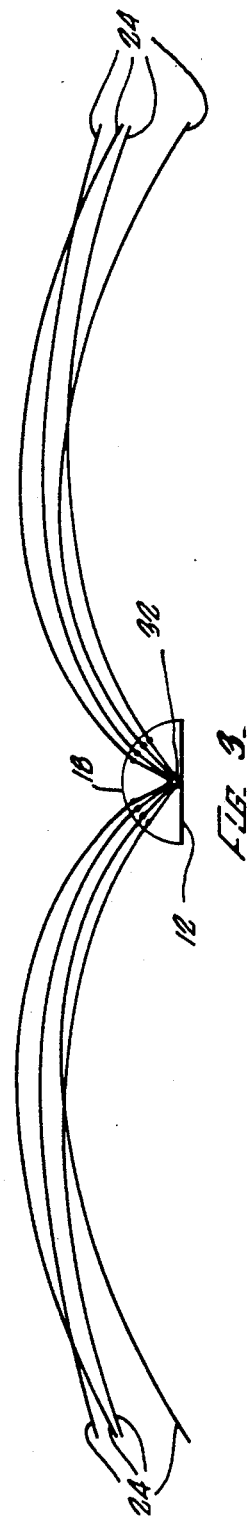

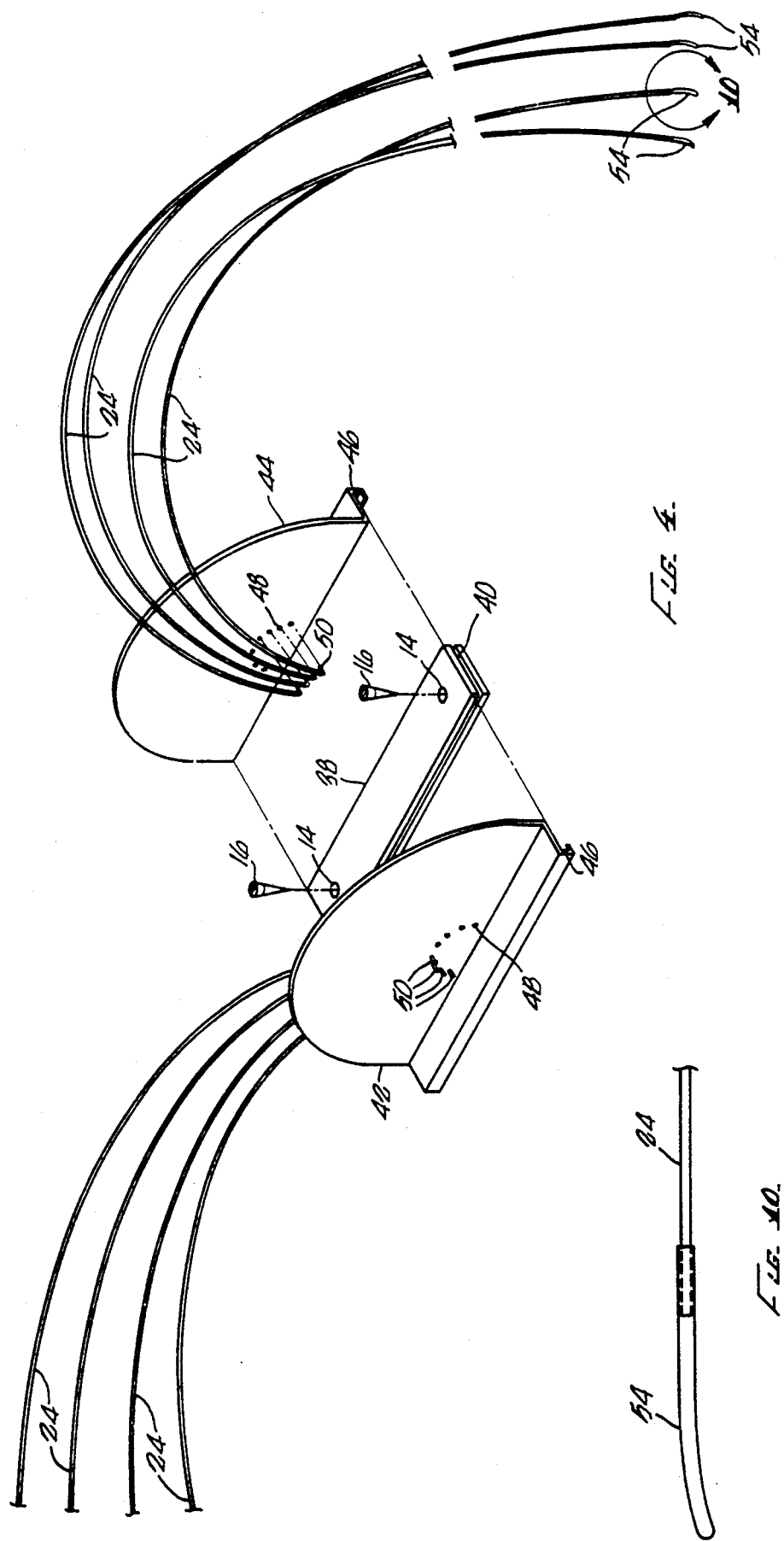

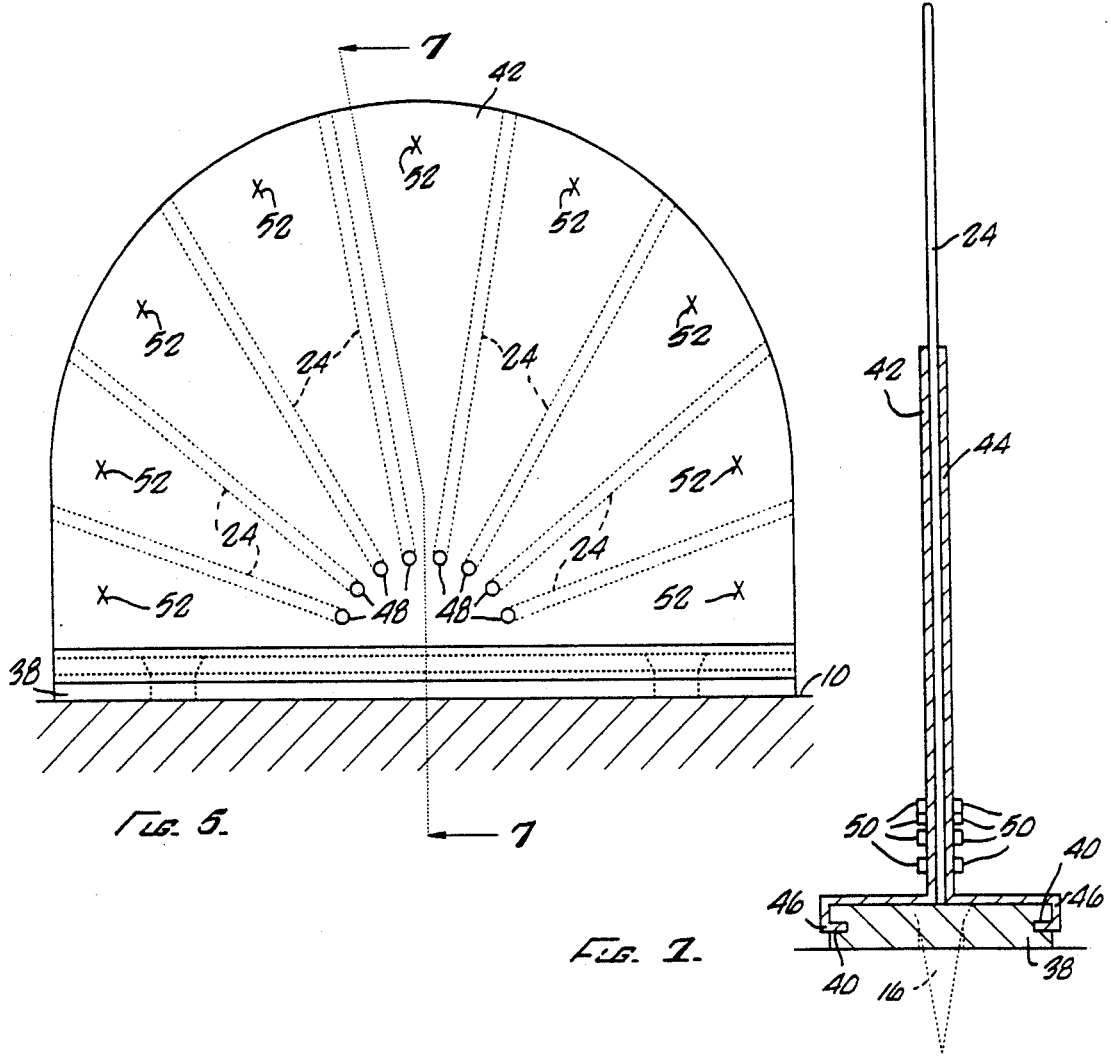

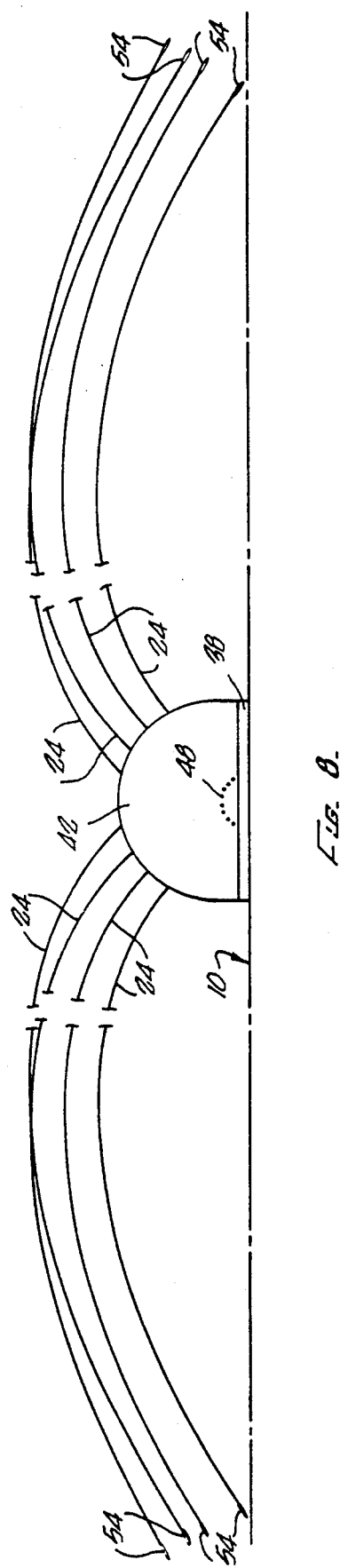

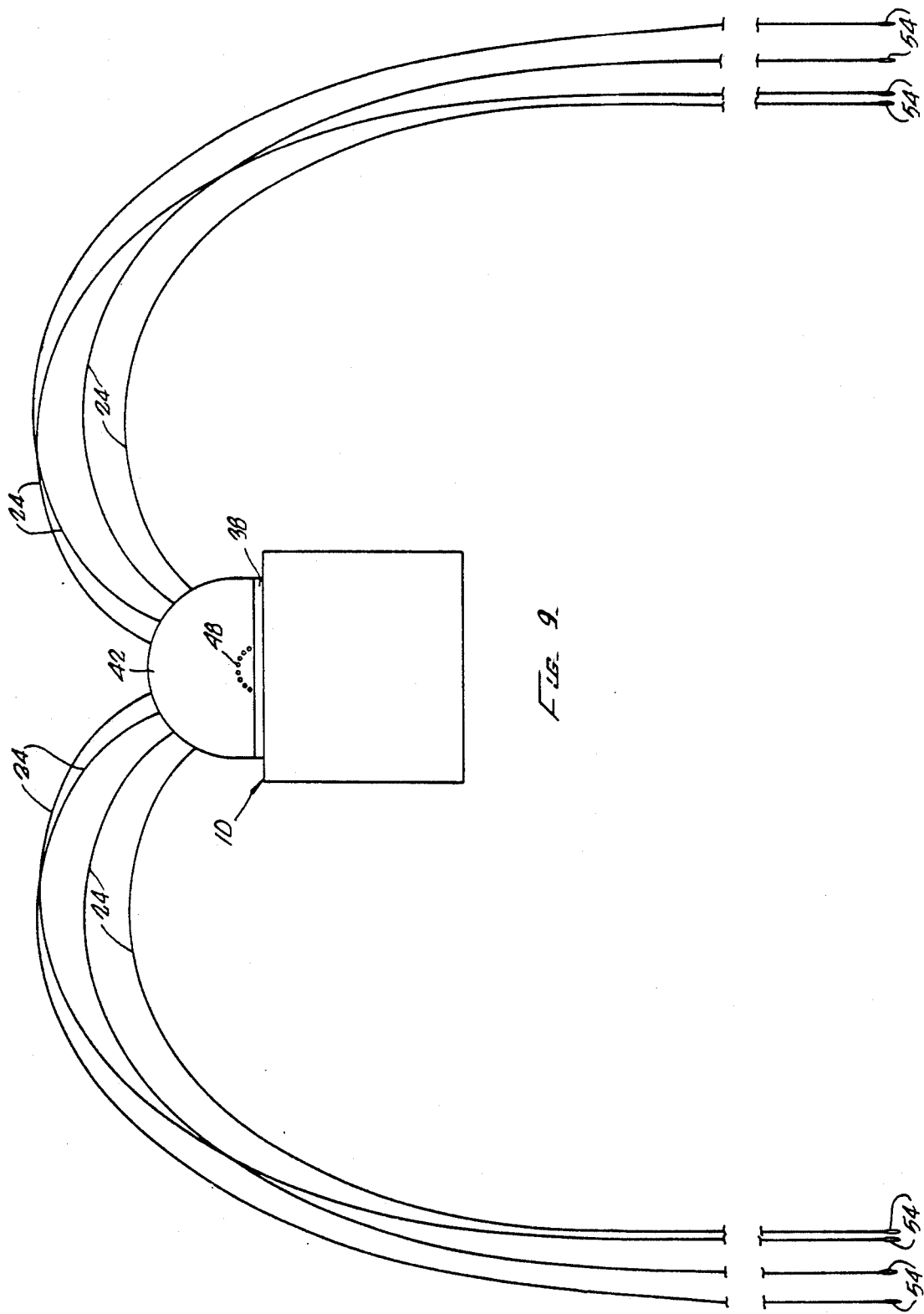

BIRD DETERRENT METHOD AND DEVICE

RELATED APPLICATION DATA

This application is a continuation-in-part of application Ser. No. 07/780,377 filed Oct. 03, 1991, now abandoned, which was a continuation of application Ser. No. 07/557,411 filed Jul. 23, 1990 and also abandoned.

BACKGROUND OF THE INVENTION

The field of the present invention is mechanical devices and methods for deterring birds from landing at undesirable perch locations. Historically, birds have been a constant pest to all types of structures and activities of man. Particularly troublesome are areas with large populations of swallows, seagulls, and pigeons although other species such as starlings, sparrows, swallows and blackbirds create problems. These unwelcome birds create unwanted noise and their droppings are an unsightly testimony to their presence on public structures and private residences. The bird droppings can also present a threat to human health. Fungi in these bird droppings can transmit diseases to humans, with potentially fatal consequences to those suffering from diabetes, blood diseases or a respiratory disease.

A particular problem is the narrow ledges common in our urban areas. Numerous methods and devices have been utilized to keep birds away from these areas where the birds are known to roost and subsequently build their nests. Several methods have utilized inanimate devices comprised of a continuous metal strip or spine with sharp, protruding spikes. However, to be effective, these must be accurately placed on the nesting area. Also, this device is conducive to nest building by the more industrious of the bird pests, due to its immobile character. Such devices may be injurious to the birds that impale their wings onto the sharp spikes. These devices are also potentially injurious to humans who unknowingly venture too close. These devices are also surprisingly expensive. Also, leaves become impaled on the pointed spikes, decreasing their effectiveness. Others have tried certain chemical gels that are applied to the perching area giving the perching birds a chemical hot foot. These, however, have a limited life span, as the gel collects debris, rendering it ineffective and, to no one's surprise, the gel eventually wears off the perching area. Mock predators have been used, but these eventually lose their deterrence effect. After a short time period, pigeons will sit quite comfortably atop these "artificial adversaries." It is noteworthy that none of these bird deterrents display the erratic motion which especially frightens the birds.

Another popular device is an electrified wire draped strategically around the nesting or perching area of the birds. These have been used at public buildings, but their high installation cost prohibits use at residences or smaller public facilities. Also, there is the constant cost of keeping the wires electrified and the potential for injury to humans.

Noise deterrent devices have been used but these also annoy the human occupants of the building or residence. Ultrasound emitters effectively deter birds but also household pets, such as cats and dogs, and thus are not real solutions. Another device emits an intermittent flash of light that is disruptive to the birds. This device is ineffective for exterior areas during daylight hours and requires constant upkeep.

Others have employed real life predators such as peregrine falcons to get rid of the bird pests. These are unreliable over the long run as the predator may do away with small dogs, cats and anything else seen as potential prey. Also, they do not address the problem of the offensive mess left by the predator itself. Still others have employed the particularly offensive method of shooting large numbers of the offending birds only to have others replace the killed pests.

Reference is made to U.S. Pat. No. 4,841,914 for "Method and Apparatus For Deterring Birds" issued to V. Chatten illustrating an inanimate bird deterrent. Reference is also made to a pending application entitled "Mechanical Apparatus for Deterring Birds," Ser. No. 07/475,215, filed Feb. 5, 1990, and to a Continuation-In-Part of that application entitled "Methods and Apparatus for Deterring Birds", Ser. No. 07/523,744, filed May 15, 1990. These illustrate an animated bird deterrent device. The aforementioned patent and patent applications are hereby incorporated by reference herein.

In view of the foregoing, a need has arisen for a bird deterrent device that is effective on narrow building ledges which combines the best features of the inanimate devices with the best features of the movable devices and behaves in an erratic bird deterring fashion. It must be adaptable to public buildings and private residences, be relatively inexpensive and easy to install, and not be injurious to the birds or offensive or injurious to humans.

SUMMARY OF THE INVENTION

The present invention combines the features of a static bird deterrent device with animated and erratic movement that especially frightens birds. This device does not injure the birds and is more noticeable by humans who unknowingly venture too close. The invention consists of a minimum of parts and thus is easy to operate and maintain. Also, it is typically affixed to an overhead location and is not noticed by the casual observer.

In one aspect, the bird deterrent device comprises a base, a flange and multiplicity of projecting members extending outward which are thin steel or aluminum wires in the preferred embodiment. The projecting members cantilever outward from the flange far enough so that portions of their cantilevered lengths are erratically disturbed by drafts of air. Each individual member moves independently of the other projecting members. The projecting members may be of the same length or they may be of different lengths but the longer length projecting members may extend out in different planar orientations relative to the flange or extend out a substantially longer distance from the flange, thus tending to be even more influenced by a draft of air. In addition to the physical barrier created by the presence of the invention, the erratic swaying of the projecting members due to the wind or drafts of air sufficiently creates a larger deterrent such that a bird will not attempt to alight near the device or a close by perching area. This feature eliminates the need for straight and/or pointed end portions on the projecting members which can injure the birds or injure human onlookers who venture too close.

One embodiment of the invention is particularly suited to narrow building ledges chosen as an overhead perch position by the birds, a common occurrence in our urban centers. The present invention is also suited for use on billboards commonly located in cities, towns and on the nation's highways. To further enhance the safety of the invention, a colorful sleeve may be secured on the ends of the projecting members. Another aspect provides for two flanges which are slidably secured to a narrow base portion. In this aspect, the projecting members are secured between the two flanges and then cantilever outward from these flanges a substantial distance beyond the base.

Accordingly, it is an object of the present invention to provide a method and device providing an economical and easy to install deterrent to bird perching. Other and further objects and advantages will appear hereinafter.

BRIEF DESCRIPTION OF THE DRAWINGS

FIG. 1 is a perspective view of the preferred embodiment of the present invention illustrating the flange, the base and the attachment of the projecting members to the flange with hidden lines illustrating portions of the projecting members adjacent to the washer.

FIG. 2 is a section view of the preferred embodiment taken along line 2—2 of FIG. 1.

FIG. 3 is a front view of one embodiment illustrating the relative length of the wires in relationship to the flange.

FIG. 4 is an exploded perspective view of another embodiment of the present invention.

FIG. 5 is a side elevation view of the flange shown in FIG. 4 illustrating the assembled positions of the projecting members and the location of the spot welds.

FIG. 6 is a plan view of the base.

FIG. 7 is a section view taken along line 7—7 of FIG. 5 illustrating the position of the first and second flanges while secured to the base and illustrating a projecting member secured between the flanges.

FIG. 8 is a front elevation view of one embodiment illustrating the relative lengths of the projecting members.

FIG. 9 is a side elevation view of another embodiment illustrating longer relative lengths of the projecting members.

FIG. 10 illustrates the plastic sleeve secured to the distal end of a projecting member.

DETAILED DESCRIPTION OF THE PREFERRED EMBODIMENT

Referring now to the figures, FIG. 1 shows one embodiment of the present invention placed on a perch area 10. The bottom portion of the invention is the base 12. The base 12 is secured to the perch area 10 by connectors 16 placed through the apertures 14 and onto the perch area 10. As shown in FIG. 1, two connectors 16 are generally required for support, although the use of a chemical substance, such as a common glue product, to secure the device to the perch area 10 may instead be used. Extending outward from the base 12 is the flange 18 which is shown in its preferred fan-shaped embodiment as shown in FIG. 1. Placed through a central portion of the flange 18 is the bore 20, shown in FIG. 2.

A pin 26 is placed through the bore 20. This pin 26 is comprised of a head 28 and a blunt end 30 which maintain the position of the pin 26 within the bore 20. On an opposing face of the flange 18 is the washer 32 placed adjacent to the head 28 to secure a multiplicity of projecting members 24 to the flange 18 as shown in FIGS. 1 and 2. The projecting members 24 are positioned onto the flange 18 and around the pin 26 abutting the washer 32 at or near the approximate mid-length positions of the projecting members 24 as illustrated in FIG. 1. The preferred embodiment utilizes four projecting members 24 as shown in FIG. 3 which are positioned on the flange 18 so as to initially extend out from the flange 18 in a planar fashion. The projecting members 24 are also supported at two other points along their respective lengths by perforations 22, which are generally small C-shaped sections punched out of the flange 18 as also shown in FIG. 1. The projecting members 24 may have a first thickness 34 as shown in FIG. 1 which does not permit them to individually support the weight of a bird when secured to the flange 18 as shown in the figures. Alternatively, the projecting members 24 are generally round and made of a steel or aluminum wire having a diameter of 0.050 inches. The projecting members 24 extend out a first distance 36 on each side of the flange 18 as shown in FIG. 3 and will be erratically influenced by a draft of air or even by the draft from the flutter of the wings of a nearby bird. The projecting members 24 move independently of the other members 24. Due to the position and length of the members 24, they will not lie in a generally parallel relationship with each other as illustrated in FIG. 3. One or more of the members 24 may intersect the path of another member 24, which tends to cause an even more disruptive influence on the birds.

Turning now to FIG. 4, another embodiment is shown comprised of a base 38 which is similarly secured to a bird perch area 10 by connectors 16 removably positioned through apertures 14 on the base 38. The base 38 is also illustrated in plan view in FIG. 6. The base 38 is comprised of a track 40 which spans along at least two sides of the base 38 at approximately mid-height of the base 38 as shown in FIG. 4. A first flange 42 and a second flange 44, which are mirror images of each other, are secured on opposite sides of the base 38. These flanges 42 and 44 each comprise a complementary C-shaped channel section 46 to slidably fit into the track 40 on the base 38 as shown in FIG. 7. The projecting members 24 are placed between the flanges 42 and 44 with each projecting member 24 having an end hook 50 which engages one of the securing ports 48 on either the first flange 42 or second flange 44. The first flange 42 is then secured to the second flange 44 by either a plurality of rivets or spot welds 52 arranged in a symmetrical fashion between the symmetrically arranged members 24 on the flanges 42 and 44 as shown in FIG. 5.

These projecting members 24 are in communication with the interior surfaces of the first and second flanges 42 and 44 and are held in an outwardly extending position. As shown in FIG. 10, a sleeve 54 may be placed on the distal ends of the projecting members 24 to signal the presence of the members 24 to human onlookers. In this embodiment, the sleeve 54 may be a colorful plastic material. These projecting members 24 may be made of a steel or aluminum wire having a diameter of 0.050 inches. The preferred length of each projecting member 24 is four feet but longer lengths of the projecting members 24, including a length of 10 feet is within the scope of the invention. FIGS. 8 and 9 illustrate the comparative differences between the longer lengths. However, these figures are to be used for comparative purposes only and not as limitation on the length of the projecting members.

The projecting members 24 will be erratically influenced by drafts of air and each member 24 may move independently of the other members 24. Also, the projecting members 24 do not lie in a generally parallel relationship with each other and one member 24 will cross the path of the cantilevered length of another member 24 as illustrated in FIGS. 8 and 9. This causes additional disruptive movements of the members 24 when for example, one or more members 24 strike another member 24 and cause additional bird-disrupting erratic movement which especially frightens the birds.

Accordingly, a bird barrier device is disclosed. While embodiments and applications of this invention have been shown and described, it would be apparent to those skilled in the art that many more modifications are possible without departing from the inventive concepts herein. The invention is not to be restricted except in the spirit of the appended claims.

What is claimed is:

1. A bird deterrent device comprising:
   a base, with a flange projecting from said base, said flange having a plurality of perforations thereon;
   a bore placed through said flange;
   a pin engaging said bore, said pin having a head and a blunt end thereon;
   a washer placed on said pin; and
   a multiplicity of projecting members, contiguous with said flange and extending outward therefrom, said projecting members positioned adjacent to said pin and abutting said washer, each of said projecting members also being contiguous with two of said perforations.

2. The device of claim 1 where said projecting members are wires positioned in a substantially coplanar fashion with said flange.

3. The device of claim 1 where said projecting members are of substantially the same length.

4. The device of claim 1 wherein said base has at least one aperture therethrough.

5. The device of claim 1 wherein said flange is substantially fan shaped with said plurality of perforations placed symmetrically thereabout.

6. The device of claim 1 wherein said projecting members are of a first thickness so as not to support the alighting of birds thereon.

7. The device of claim 1 wherein each of said projecting members extend out a first distance substantially beyond said flange.

8. A method of deterring birds comprising the steps of:
   attaching a base by one of a mechanical or chemical means to a bird perching area, said base having an outward extending flange;
   placing a bore through said flange and placing a plurality of perforations about said flange;
   placing a pin within said bore, with a washer placed thereon, said pin having a head and a blunt portion thereon; and
   placing a multiplicity of projecting members on said flange with said projecting members abutting said pin and placed adjacent to said washer, each of said projecting members being contiguous with two of said plurality of perforations, with said projecting members extending outward from two opposite sides of said flange in a substantially coplanar fashion.

9. The method described in claim 8 wherein said projecting members are of a first thickness so as not to support the alighting of birds thereon.

10. The method described in claim 8 wherein said projecting members extend out a first distance from two opposite sides of said flange.

11. A deterrent to the alighting of birds comprising:
    a base secured to a bird perching area by conventional attachment means;
    a flange integrally formed with said base and extending therefrom;
    a multiplicity of projecting members demountably coupled to a planar surface of said flange and intermediately supported by said flange to allow each projecting member to symmetrically cantilever out from opposing sides of said flange, said projecting members do not lie in a substantially parallel relationship to each other and a substantial portion of the cantilevered lengths of said projecting members is visibly disturbed by a draft of air.

12. The bird deterrent of claim 11 wherein the cantilevered lengths of said projecting members measured from the outer edge of said flange are in excess of two feet.

13. The bird deterrent of claim 11 wherein a substantial portion of the cantilevered lengths of said projecting members is put into erratic motion by air drafts caused by the fluttering wings of a nearby bird in flight.

14. The deterrent of claim 11 comprising four projecting members each having substantially the same length.

15. The deterrent of claim 11 where none of said projecting members terminate in pointed end portions.

16. The deterrent of claim 11 where said conventional attachment means is a chemical means.

17. The deterrent of claim 11 where said conventional attachment means is a mechanical means.

18. The deterrent of claim 11 where said projecting members are substantially round wires having a diameter of approximately 0.050 inches.

19. A bird deterrent device which creates a barrier to the nearby alighting of birds by the erratic motion of a multiplicity of wires caused by drafts of air against said wires, said wires supported by at least one flange and a base affixed to a bird perching area, each of said wires extending outward a distance in excess of two feet from opposite sides of said flange measured from the outer edge of said flange along the cantilevered lengths of said projecting members and said wires do not lie in a substantially parallel relationship with each other.

20. A method of deterring birds from perching comprising the steps of:
    attaching a base to a bird perching area by a mechanical or chemical means said base having an outwardly extending flange;
    releasably securing a multiplicity of wires on a planar surface of said flange adjacent to the midpoints of said wires; and
    positioning said multiplicity of wires so each of said wires is cantilevered a distance in excess of two feet from opposing sides of said flange so that a substantial length of the cantilevered portions of said wires is erratically disturbed by air movement against said wires.

21. The deterrent of claim 11 or claim 19 where each of said projecting members further comprises a sleeve secured to the distal ends of said projecting members.

22. A deterrent to the alighting of birds comprising:
    a base secured to a bird perching area;
    a first flange and a second flange releasably secured to said base, said flanges placed adjacent to one another and secured together by mechanical or chemical means; and a multiplicity of projecting members between said first and second flanges, said projecting members cantilevering outward from said first and second flanges so that the projecting members do not lie in a substantially parallel relationship with each other and are independently disturbed in an erratic manner to create a visible deterrent to the nearby alighting of birds.

23. A deterrent to the alighting of birds comprising:
a base,
a first flange and a second flange, slidably secured to said base; and
a multiplicity of projecting members, secured to said first and second flanges and cantilevering outward therefrom so that a substantial length of said projecting members is visibly disturbed independently by air movement against said projecting members.

24. The deterrent of claim 22 o claim 23 where said projecting members are each of a length of approximately four feet.

25. The deterrent of claim 22 or claim 23 where said projecting members are each of a length of approximately ten feet.

26. The deterrent of claim 22 or claim 23 where said projecting members are substantially round wires of a diameter of approximately 0.050 inches.

27. The deterrent of claim 22 or claim 23 where said first and second flanges comprise a plurality of securing ports and each projecting member comprises an end hook which engages at least one of said securing ports.

28. The deterrent of claim 22 or claim 23 where each of said projecting members further comprises a sleeve secured to the distal ends of said projecting members.

29. A bird deterrent comprising:
a base, with a first flange and a second flange removably secured to a track on said base;
a multiplicity of wires of a diameter of approximately 0.050 inches each comprising an end hook, said wires secured between said first and second flanges with each of said end hooks engaging a securing port on one of said flanges, said wires cantilever outward from said flanges so each of said wires independently moves in an erratic manner so that said erratic movement of said wires is a visible deterrent to the nearby alighting of birds, each of said wires comprising a sleeve secured to the distal ends of said wires.

30. The deterrent of claim 29 where said wires are four feet long.

31. The deterrent of claim 29 where said wires are ten feet long.

* * * * *

UNITED STATES PATENT AND TRADEMARK OFFICE
CERTIFICATE OF CORRECTION

PATENT NO. : 5,181,338

DATED : January 26, 1993

INVENTOR(S) : Victor H. Chatten

It is certified that error appears in the above-identified patent and that said Letters Patent is hereby corrected as shown below:

TITLE PAGE

IN THE ABSTRACT:

Line 4, after "sharp" delete "and" and add -- end --.

Column 1, line 6, change "October 03" to -- October 21 --.

Signed and Sealed this

Thirty-first Day of May, 1994

Attest:

BRUCE LEHMAN

Attesting Officer

Commissioner of Patents and Trademarks